United States Patent [19]

Conta et al.

[11] Patent Number: 4,623,904

[45] Date of Patent: Nov. 18, 1986

[54] INK-JET PRINTING HEAD, A METHOD FOR ITS MANUFACTURE, AND A TOOL USEABLE FOR CARRYING OUT THIS METHOD

[75] Inventors: Renato Conta, Ivrea; Vincenzo Perucca, Banchette; Remo Rocchi, Turin, all of Italy

[73] Assignee: Ing. C. Olivetti & C., S.p.A., Italy

[21] Appl. No.: 780,039

[22] Filed: Sep. 25, 1985

[30] Foreign Application Priority Data

Sep. 25, 1984 [IT] Italy .............................. 67954 A/84

[51] Int. Cl.[4] .............................................. G01D 15/18

[52] U.S. Cl. ............................... 346/140 R; 29/25.35; 29/856; 29/760

[58] Field of Search ........................... 346/140, 139 C; 29/25.35, 856, 760

[56] References Cited

U.S. PATENT DOCUMENTS 4,158,847 6/1979 Heinzl ................................ 346/140
4,368,477 1/1983 Heinzl ................................ 346/140
4,485,386 11/1984 Dagna ............................ 346/140 X
4,504,845 3/1985 Kattner .............................. 346/140
4,528,575 7/1985 Matsuda ............................. 346/140

*Primary Examiner*—Joseph W. Hartary
*Attorney, Agent, or Firm*—Banner, Birch, McKie & Beckett

[57] ABSTRACT

Mounted within a substantially hollow supporting and containing housing are tubes which communicate at one end with an ink reservoir and whose opposite ends are aligned with respective ink discharge nozzles provided in a plate member which faces the printing surface in use. The plate is mounted on the housing so as not to touch the ends of the tubes and with the interposition of yieldable sealing members. The tubes are mounted in the housing with the aid of a positioning tool the shape of which reproduces essentially the shape of the plate. A resin is subsequently poured into the housing and, after hardening, constitutes an elastic mass for retaining the tubes in the housing.

30 Claims, 18 Drawing Figures

INK-JET PRINTING HEAD, A METHOD FOR ITS MANUFACTURE, AND A TOOL USEABLE FOR CARRYING OUT THIS METHOD

The present invention relates to ink-jet printers and is particularly concerned with an ink-jet printing head comprising a plurality of tubes having one end communicating with an ink reservoir, each tube having a corresponding associated electrical signal transducer for generating an instantaneous variation in the volume of the tube so as to cause the discharge of the ink through the other end of the tube towards a printing surface, the tubes being supported by a common support having a plate member (plate) provided with a series of nozzles aligned with the other ends of the tubes.

In known heads of this type, the tubes (generally of glass) are enclosed in a housing which protects their free ends. The variations in general form of the transducers (generally piezo-electric) are discharged on the housing and create reflected waves which limit the printing speed.

An object of the present invention is to provide an ink jet printing head which allows very high printing speeds to be achieved even with on-demand operation.

In the manufacture of such heads, which are intended for use, for example, in printers associated with electronic processors, personal computers, advanced technology typewriters, etc., there is the problem of forming the capillary nozzles and their ink supply tubes with high precision and with reduced manufacturing costs and times. Because of intrinsic requirements of the printing process, in fact, these nozzles are very short distances apart, of the order of fractions of a millimetre.

A further object of the present invention is to provide an answer to this problem, allowing a printing head with a plurality of capillary nozzles for the discharge of the ink to be made with reduced times and working costs, while ensuring a finished product of high quality.

Figure 1:
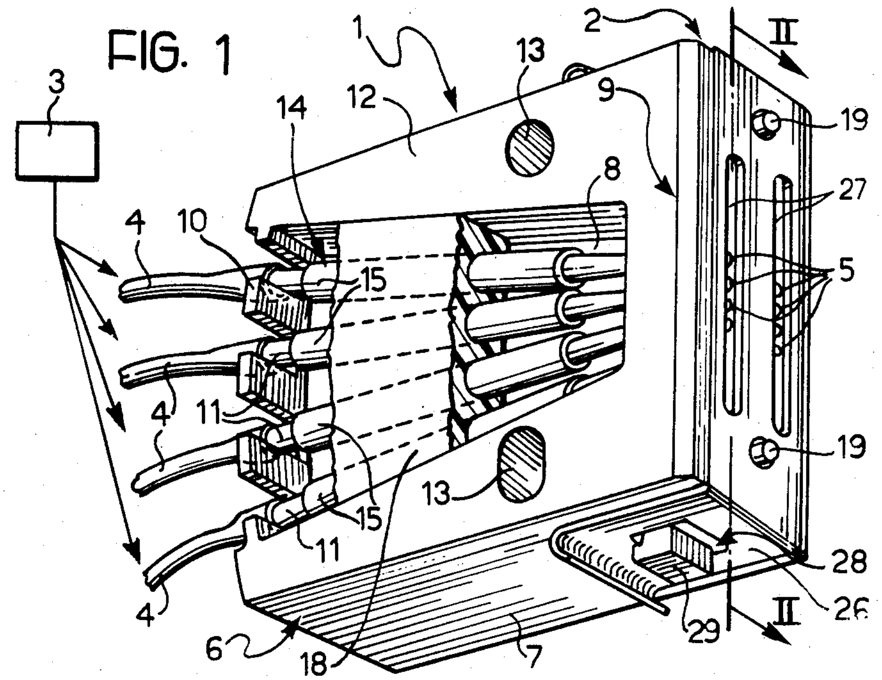
Figure 2:
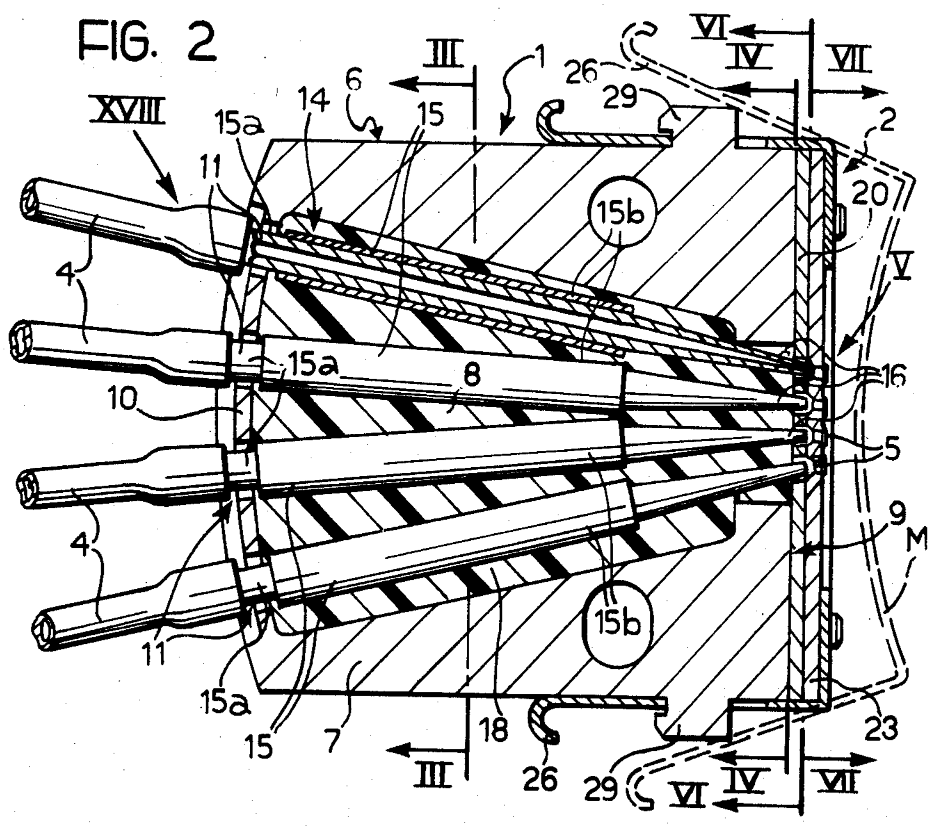
Figure 3:
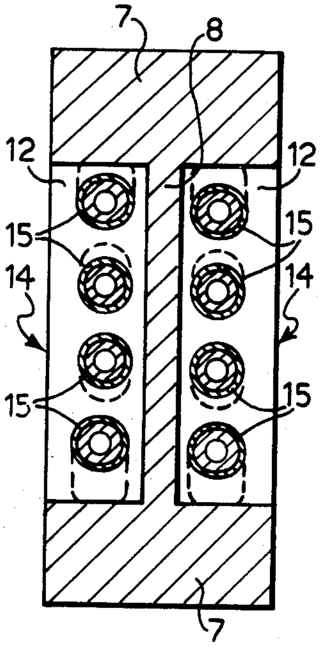
Figure 4:
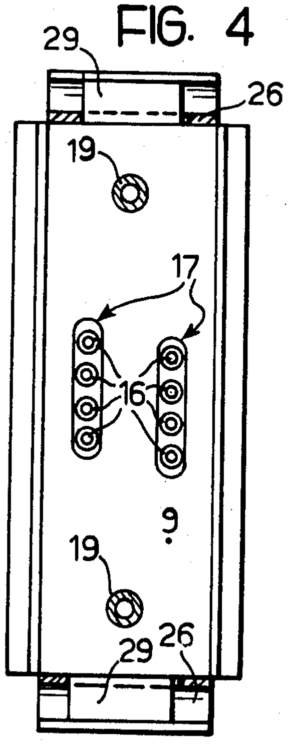
Figure 7:
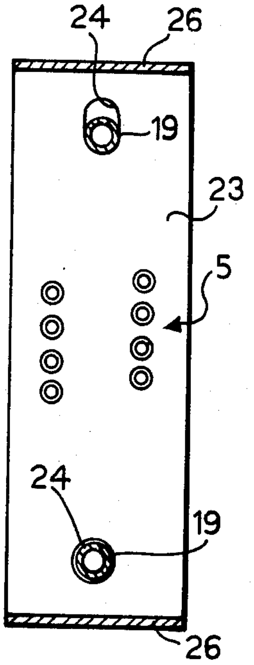
Figure 5:
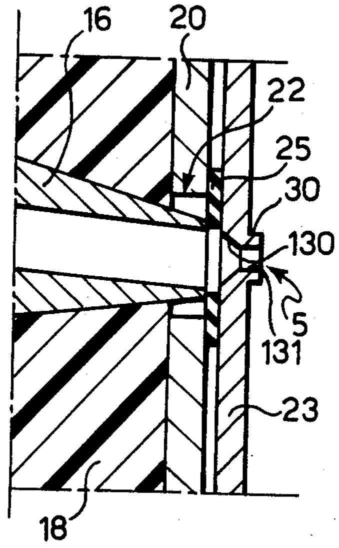
Figure 6:
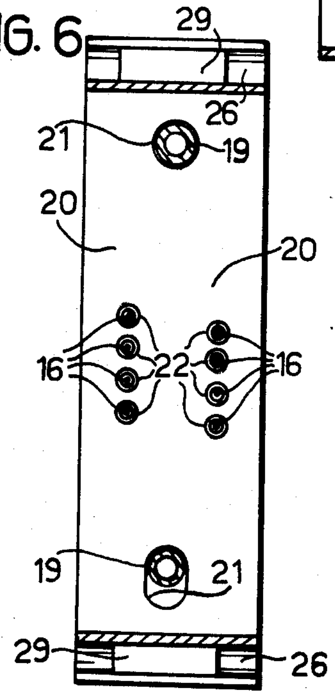
Figure 8:
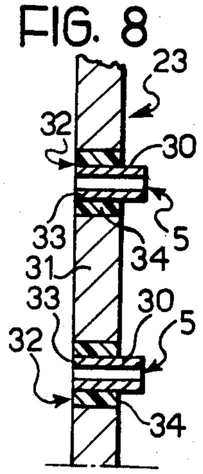
Figure 9:
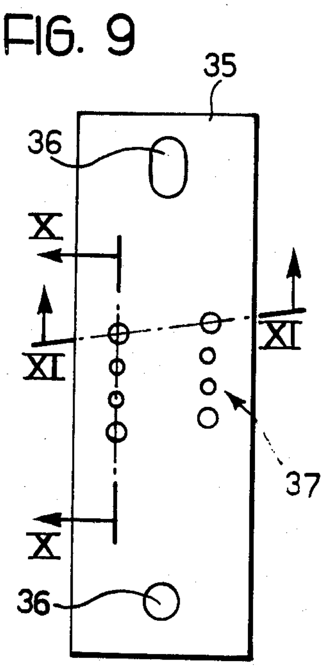
Figure 10:
Figure 11:
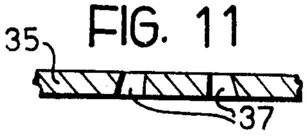
Figure 12:
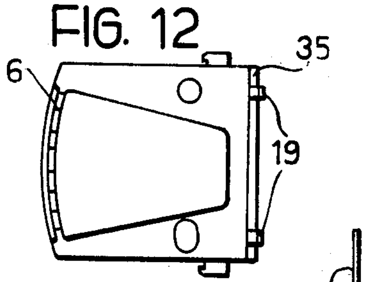
Figure 17:
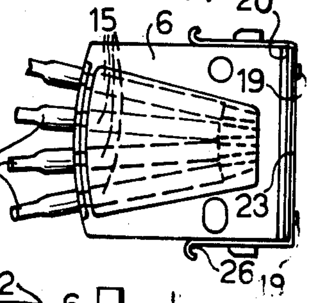
Figure 18:
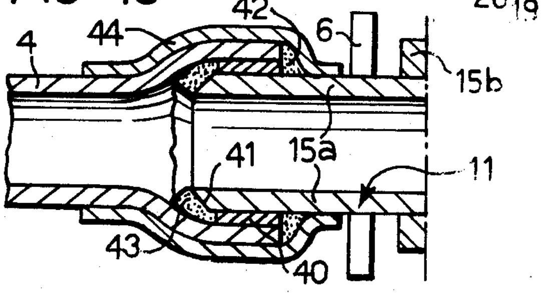

The invention will now be described, purely by way of non-limiting example, with reference to the appended drawing, in which:

FIG. 1 is a general perspective view of a printer according to the invention, FIG. 2 is a section through the printer of FIG. 1, taken in a vertical plane approximately corresponding to the plane identified by the line II—II of FIG. 1, FIG. 3 is a section taken on the line III—III of FIG. 2, FIG. 4 is a section taken on the line IV—IV of FIG. 2, FIG. 5 is a view, on an enlarged scale, of the part of FIG. 2 indicated by the arrow V in FIG. 2 itself, FIG. 6 is a view on the line VI—VI of FIG. 2, FIG. 7 is a view on the line VII—VII of FIG. 2, FIG. 8 illustrates a possible variant of one of the elements illustrated in FIG. 2, FIG. 9 is a schematic illustration of a tool useable for carrying out the method of the invention, FIGS. 10 and 11 are two sections taken on the lines IX—IX and X—X, respectively, of FIG. 9, FIGS. 12 to 17 are schematic illustrations of successive steps in the method of the invention, and FIG. 18 illustrates on an enlarged scale and in longitudinal section the region of FIG. 2 indicated by the arrow XVIII.

In FIGS. 1 and 2, an ink-jet printing head 1 (ink-jet printer) for mounting in a printing machine, such as a high-speed printer associated with an electronic processor, personal computer, word processing system or an advanced technology typewriter, is generally indicated 1.

In use, the head 1, which has a generally prismatic or parallel opipedal shape, is intended to be mounted in the structure of the printing machine (not illustrated in its entirety) in a disposition such that the frontal surface of the head 1, indicated 2 in the drawings, faces a surface (normally constituted by a sheet of paper) on which it is wished to print a graphic sign. This graphic sign, generally termed writing or printing, may be constituted by alpha-numeric characters, graphics, histograms, symbols, etc.

The head 1 is mounted on a transversely reciprocating carriage which moves the head 1 to face successive zones arranged adjacent each line of the printing substrate.

The ink used for the printing is taken from a reservoir, schematically indicated 3. The ink is conveyed to the head 1 through a plurality of flexible plastic tubes 4.

The ink is projected towards the printing substrate through a plurality of capillary nozzles 5 located in the front part 2 of the head 1.

In the embodiment illustrated here, the head 1 includes eight nozzles 5 arranged in an array comprising two columns each containing four nozzles, disposed parallel to each other at a distance of about 2.54 mm.

Each column includes four nozzles about 0.846 mm apart. The nozzles in the two columns are staggered relative to each other by a distance of 0.423 mm, that is a distance equal to half the distance between the nozzles in each column.

The nozzles 5 are thus able to form up to eight printed points simultaneously.

The distances indicated and the relative disposition of the nozzles 5 are dictated by international standardization provisions and allow the printing of alpha-numeric characters reproduced on a dot-matrix basis. The number of points constituting each character may possibly be increased, allowing the reproduction of alpha-numeric characters of increasing clarity, the head 1 being made to scan the same region of the printing substrate in successive passes.

The housing of the head 1 is defined by a hollow body 6 of moulded plastics material constituted by a resin (for example, that known commercially as NORIL and made by the General Electric Company) filled with glass in a proportion of about 30%.

The body 6, which is generally flat, may be considered as being constituted by a perimetral wall 7 of roughly quadrilateral shape within which a substantially flat wall 8 (FIG. 3) constituting the core of the body 6 extends in a position approximately midway between the end edges of the wall 7.

Particularly duistinguishable in the perimetral wall 7 are a flat front portion 9, illustrated in greater detail in FIG. 4, and a generally circular or arcuate rear portion 10 with a centre of curvature facing towards the front portion 2 of the head. The rear portion 10 of the peripheral wall 7 of the body 6 has eight U-shaped notches 11 facing outwardly of the body 6 and divided into two series of four notches opening onto respective sides of the body 6.

Each of these sides is then enclosed by a lateral wall 12 traversed by apertures 13 for the fixing of the head 1 to the drive carriage and having a wide U- or V-shaped recess 14 which renders the interior of the body 6 accessible from both sides.

As is best seen in FIG. 3, the body 6 is substantially symmetrical about the plane of the central wall 8.

Eight tubes 15 are mounted within the body 6 for conveying ink to the nozzles 5, each tube being connected at one end to one of the tubes 4 and facing a respective nozzle 5 at its opposite end, termed the ink discharge end 16 below.

The tubes 15 are constituted by glass ejector members formed essentially by the method described in Italian Patent Application No. 67135-A/83 by the same Applicants. Alternatively, these ejector elements may be of metal, for example nickel.

By way of summary, each ink conveying tube 15 is constituted by a capillary tube 15*a* of glass or metal such as, for example, heatproof glass (Pyrex glass) or nickel. The overall length of each capillary tube 15*a* is about 1.5–2 cms, with a diameter of about 1 mm and a wall thickness of about 5–15 hundredths of a millimetre.

At its ink discharge end 16, each capillary tube 15*a* has a conically tapered profile extending for a length of about 4–5 mm and terminating with an ink discharge orifice having a diameter of about 150 μm.

On each glass capillary tube 15*a* is fitted a sleeve of piezo-electric material 15*b* which can reduce its inner diameter when a voltage pulse (generated by an electrical energisation source, not illustrated) is applied between the outer surface and the inner surface of the transducer.

When an energisation pulse is applied to the transducer, its radial contraction causes a corresponding contraction of the wall of the glass tube which is filled with ink from the reservoir 3. The effect of this contraction is to generate pressure waves within the ink, which causes the expulsion of a drop of ink through the discharge end 16.

In known manner, the dimensions and elastic characteristics of the supply tubes 4 are selected so that these tubes absorb the pressure wave generated in the ink and directed from the discharge end 16 towards the tubes 4 themselves, in order to avoid the reflection of this wave and the undesired discharge of additional ink drops (satellites).

The ink conveying tubes 15 are mounted within the body 6 in two arrays located on opposite sides of the central wall 8. Each array includes four tubes 15 disposed, so to speak, in a rayed manner, in an arrangement such that the main axes of the tubes of each array converge towards the front wall 9 of the body 6.

As is best seen in FIG. 4, this wall has two apertures 17 in the form of slots through which the discharge ends 16 of the tubes 15 face outwardly of the body 6.

The tubes 15 in each array lie in a single plane which is slightly inclined to the central wall 8 of the body 6 in a disposition such that (see FIG. 3) the planes of the two arrays of tubes 15 converge on each other towards the front wall 9 of the body 6 itself.

The arrangement described allows the "rear" ends of the tubes 15 to be spaced slightly apart so as to facilitate their connection to the supply tubes 4.

The tubes 15, and in particular their ink discharge ends 16, are embedded in a mass 18 of flexible epoxy or silicone resin constituting both a retaining mass which holds the tubes 15 in the body 6 and an insulating mass which minimises transmission of mechanical forces between the adjacent tubes. Mechanical forces resulting from the impulsive energisation of the peizo-electric transducer 15*b* associated with one of these tubes are thus prevented from causing the undesired emission of ink drops from adjacent tubes. The resin mass may be constituted, for example, by the commercial resin SILASTIC made by the Dow Corporation or the resin known as ECCOSYL RTV made by Emerson Cuming Inc.

From the front portion 9 of the body 6 projects a pair of tubular or cylindrical (pin) formations 19 for enabling it to be fitted precisely onto the housing of a ceramic or metal frontal plate member 20 having a thickness of about 0.25 mm.

In addition to a pair of apertures 21 which allow its engagement with the guide pins 19, the frontal member 20 has eight circular holes, generally indicated 22, each of which (see FIG. 6) constitutes a seat for receiving the ink discharge end 16 of a respective tube 15. Holes 22, which are obtained for instance by laser beam machining, have diameter comprised between 0.65 and 0.7 mm. More particularly, the "outer" holes of the two arrays, that is to say the holes facing the apertures 21, have a greater diameter than the "inner" holes: this choice results from the fact that the outer holes act as seats for receiving the ends 16 of the tubes 15 having a greater inclination to the median plane of the body 6.

The dimensions of the holes 22, however, are selected so as to be slightly greater than the transverse dimensions of the ends 16 of the duct 15 housed therein. This is in order to allow the resin 18 which is poured into the body 6 (as will be better seen below) to penetrate the annular regions between the outer wall of each end 16 and the inner wall of the corresponding hole 22 so as to effect sealing and insulation against vibrations between the end 16 and the frontal element 20.

To the face of the frontal member 20 opposite the body 6 is applied a further frontal member 23 constituted by a metal plate, for example of stainless steel or nickel, provided with apertures 24 for engagement with the guide pins 19 projecting from the body 6.

The plate 23 also has eight profiled apertures each of which constitutes one of the nozzles 5 for projecting the ink (FIG. 1).

As is best seen in FIG. 5, when the frontal element or plate 23 is mounted on the body 6, each nozzle 5 is aligned with a corresponding hole 22 in the element 20 and consequently with the ink discharge end 16 of a respective duct 15.

An annular sealing gasket 25 is also provided between the frontal member 20 and the frontal member 23, at least in the region surrounding each pair of aligned holes 22, 5. This gasket may be constituted, for example, by a layer of flexible resin such as the silicone resin SILASTIC, or by a ductile metal such as gold, tin, indium, etc.

The shape of the apertures 21 and 24 provided in the frontal members 20 and 23 allows very high precision to be achieved in assembly of the frontal members 20 and 23, ensuring that the desired condition of alignment between the ink discharge ends 16, the holes 22 and the capillary nozzles 5 is achieved. The gasket 25 also allows a certain degree of translational movement between each tube 15 and the element 23 carrying the nozzles 5, which do not therefore undergo the variations produced on the ends 16 by the transducers 15*b*.

The frontal elements 20 and 23 are firmly retained on the body 6 by a leaf spring 26 having a generally C shape. The central arm or central part of the spring 26 has apertures for the passage of the pins 19 and central elongate apertures 27 which leave uncovered the portions of the frontal member or plate 23 in which the nozzles 5 are provided. The lateral arms of the spring 26 have apertures 28 to allow fitting of the spring 26 on corresponding toothed formation 29 projecting laterally from the perimetral wall 7 of the body 6 adjacent the ends of the front wall 9.

The central part of the spring 26 is arcuate in the rest condition illustrated in broken outline and indicated M in FIG. 2. Consequently, when the spring 26 is fitted onto the housing 6, the central part exerts a uniform pressure on the plate 23 over its entire length. More particularly, this shape is achieved by the calculation of the deformation which this pressure would generate in a beam reproducing the central part and resting at its two ends. This shape has a radius of curvature which increases from the centre to the two ends.

As is best seen in FIG. 5, each nozzle 5 of the frontal element 23 is defined by a generally cylindrical tubular wall. Preferably, it has a flared mouth 130 facing the end 16 of the respective tube 15 and a cylindrical portion 131 facing the end opposite the nozzle 5 (facing the printing surface), which is defined by a tubular appendage 30 projecting beyond the surface of the element 23 opposite the body 6. The mouth 130 is flared by about 15°, while the portion 131 has a length about equal to its diameter, which is 50–80 μm. This particular conformation is designed to have a breaking effect on the ink drops which may form on the frontal surface of the head 1 between one nozzle and the adjacent one, particularly the underlying one. Moreover, its prevents the formation of the drops being disturbed by a film of ink or, in any case, by the accumulation of dirt which could result in a deterioration in the performance of the head.

By leaving the end 16 of the tubes free of the plate 23 which closes the housing 7 and preventing the influence of any ink which is discharged from one nozzle 5 on other nozzles, drops are obtained which move parallel to the axes of the nozzles 5. Moreover, mutual disturbance between the transducers and the additional acoustic reflections is eliminated, whereby each transducer may be excited at a frequency of up to 10 KHz, significantly increasing the printing speed.

The frontal member (plate) 23 may be manufactured by various known methods.

In a first solution, the frontal member 23 may be constituted by a perforated nickel plate having a thickness of the order of 50–100 microns and made by electroforming.

A further solution is that of manufacturing the element 23 by subjecting the plates of nickel, steel or the like material to a precision spark erosion process. This solution allows the capillary holes 5 to be made with an internal roughness of less than a micron.

Yet another solution provides for the manufacture of the frontal element 23 by subjecting a plate of nickel, steel or like material to a punching (micro-punching) operation similar to that used for making dies for the manufacture of synthetic fibres. A drawn area is thus formed on the outwardly-facing surface of the plate 23. This surface is then lapped to form the holes of the nozzles with the appendages 30. The holes may then be ground by the same punch as is used for the drawing.

It is possible to use a photo-engraving process to form the drop-breaking appendages 30.

For this purpose, after both surfaces of the perforated sheet obtained by electroforming, precision spark erosion or micro-punching have been subjected to lapping and cleaning, there is applied to these surfaces a layer of light-sensitive protective material such as, for example, a layer of the photoresist made under the commercial name RISTON by the Du Pont Company. The layer of light-sensitive material is then exposed to light after a mask which leaves only the circular zones around the nozzles 5 uncovered has been applied to the plate. In these zones, the material polymerizes and adheres to the support. In the regions which are not exposed to light since they are masked, the light-sensitive material is not subjected to the "development" action and can then be removed easily by washing after the protective mask has been removed.

Subsequently, the plate with the face intended to define the surface of the element 23 facing outwardly of the body 6 is subjected to photo-engraving to a depth of about 50 microns. The circular zones surrounding the nozzles 5 are not engraved since they are covered with protective material. A tubular appendage constituting one of the appendages 30 is thus formed in each of these regions.

FIG. 8 illustrates schematically a possible variant of the frontal member 23.

According to this variant, circular holes 32 having a diameter of the order of 0.4–0.6 mm are cut by a laser beam in a ceramic plate 31 having a thickness of about 0.2 mm. A piece of glass capillary tube 33 (of quartz silica or Pyrex glass) obtained by drawing in a process similar to that used for the manufacture of optical fibres is then inserted into each hole 32. Each tube 33 has an internal diameter of about 6 microns and an outer diameter of 0.3–0.5 mm. As an alternative, gas-chromatograph capillaries with the same dimensions may be used.

The capillary tubes 33 are fixed within the holes 32 by gluing with epoxy resin 34. The capillary tubes 33 are mounted in the holes 32 so that one of the end faces of each capillary is aligned with one of the faces of the plate 31. This latter face of the plate 31 is intended to define that surface of the element 23 which faces towards the body 6 of the head 1. The other end face of each capillary 33 thus projects relative to the corresponding face of the plate 31. The portion of each capillary 33 between this latter face of the plate 31 and the end face of the capillary 33 projecting therefrom thus constitutes the appendage 30.

Both the opposite surfaces of the frontal member 23 are lapped with the interposition of a metal mask made by photo-engraving or electroforming, which protects the appendages 30 and prevents their breakage during the lapping. The projecting end surface of each appendage 30 is then cleaned and chromium-plated so as to make it substantially non-wettable by the ink.

Whichever method is used to make the frontal member 23, the use of a light-sensitive protective material such as RISTON allows the particularly rapid formation of the annular gaskets 25 which effect hydraulic sealing and decoupling with respect to mechanical vibrations between the two frontal members 20 and 23.

For example, it is possible to apply a layer of light-sensitive material with a thickness of several tenths of a micron to the surface of the element 23 which will face the element 20 and the body 6, and then subject it to the development operation (exposure to light) after a mask which leaves only the circular zones around the nozzles 5 free has been applied to the element 5 in the manner described above with reference to the formation of the appendages 30 by photo-engraving.

In the zones subject to the development process, the protective light-sensitive material polymerizes, adhering to the frontal element 23. The polymerized material has a certain degree of elasticity: this becomes a vibration-damping gasket around the aperture of each nozzle 5 facing the frontal member 20.

Another solution is that of applying a layer of protective light-sensitive material to the surface of the element 23 which is intended to face the element 20, and developing the material with the use of mask just like that used previously. Thus, it is possible to make the polymerized protective material adhere to practically the whole surface to which it has been applied, with the exception of the circular zones surrounding the apertures of the nozzles 5. After the mask has been removed, the undeveloped protective material can be removed from these zones which are subsequently filled with a polymerizable material such as the silicone product known commercially as SILASTIC. After polymerization of the SILASTIC, the light-sensitive protective material is removed from the frontal member 23 and the tubular masses of SILASTIC so formed constitute the gaskets 25.

Alternatively, instead of a polymerizable resin such as SILASTIC, a 5-10 micron layer of ductile gold, or some other ductile metal such as tin, indium, etc., may be depositied by electrolytic accretion in the zones around the nozzles left uncovered by the light-sensitive material. The formations of electrolytic metal constitute the gaskets 25 in this case.

Finally, FIG. 9 illustrates a tool 35 which can be used to assemble the head 1.

The tool 35 is constituted essentially by a plate of a metal such as brass, the overall shape of which reproduces substantially the overall shape of the frontal elements 20 and 23.

In particular, in addition to apertures 36 which allow its engagement on the pins 19 projecting from the body 6, the tool 35 has eight holes 37 the arrangement of which reproduces substantially the relative arrangement of the holes 22 and the nozzles 5.

The plate constituting the tool 35 has a thickness of about 1 mm, that is to say, a thickness which is about five times greater than the thickness of the plate constituting the frontal member 20.

The greater thickness of the plate 35 means that the holes 37 have an axial extent which is greater than that of the holes 22 which pass through the plate of the element 20.

As will be better seen below, the tool 35 allows the exact positioning of the bodies 15 when they are assembled on the body 6. For this purpose, each of the holes 37 of the tool 35 defines a receiving and guide seat for the ink discharge end 16 of a respective tube 15.

Since these tubes are arranged within the body 5 in a configuration comprising two arrays disposed in converging planes, each including, in its turn, four tubes whose ink discharge ends 16 coverge, the holes 37, as best seen in FIGS. 10 and 11 have respective main axes inclined to the planes of the opposite parallel faces of the tool 35 itself. In particular, the main axis of each hole 37 is oriented to these planes at an angle of inclination equal to the angles (in the assembled head 1) of the main axis of the corresponding tube 15 to the planes of the opposite parallel faces of the frontal member 23.

The holes 37 are defined by frusto-conical walls which taper in the same direction as the direction of convergence of the main axes of the holes themselves.

The conical shape of the holes 37 is intended to facilitate the introduction of the ends 16 of the tubes 15 into the holes themselves in the initial stage of the assembly of the head 1. In this initial assembly stage illustrated schematically in FIGS. 12 and 13, the tubes 15 are mounted in the body 6 to the front wall 9 of which is applied the positioning tool 35.

In its mounted position on the body 6, the tool 35 is oriented so that the greater-section ends of the holes 37 face the body 6 itself.

Each of the tubes 15 is mounted on the body 6 (FIG. 12) in a preassembled condition, that is, with the piezoelectric transducer **15*b* mounted on the glass capillary 15*a***.

Each tube 15 is mounted on the body 5 by the introduction of the ink discharge end 16 into a corresponding hole 37 of the positioning tool 35 and the placing of the opposite end in one of the notches 11 provided in the rear wall of the body 6.

Since the tool 35 reproduces substantially the shape of the plate member 20 and is applied to the body 6 in exactly the same position as that in which the frontal member 12 will subsequently be applied, the tubes 15 are mounted on the body 6 in an arrangement which reproduces exactly the final disposition of use.

The transducers **15*b* are subsequently fixed to the body 6 by the glue C which is applied over the whole length of the transducers 15*b*, care being taken not to block the tubes 15*a***.

Figure 14:
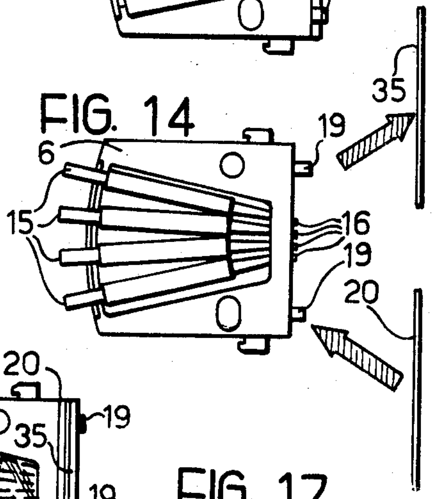
Figure 13:
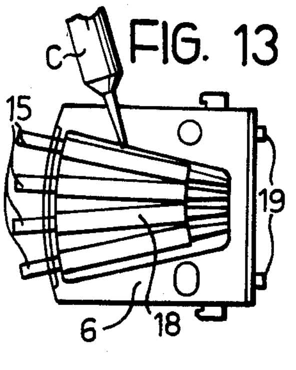

After hardening of the glue, the positioning tool 35 is removed from the body 6, it being replaced by the frontal member 20 (FIG. 14).

The application of the frontal member 20 to the body 6 is achieved without particular difficulty since the discharge ends 16 of the tubes 15 previously introduced into the holes 37 are already aligned precisely with the holes 22 in the frontal member 20.

The engagement of this frontal member with the body 6 is also facilitated by the presence of the pins 19 which slidingly engage the apertures 21.

At this point, to the surface of the element 20 opposite the body 6 is applied a gasket 38 of a silicone material such as SILASTIC, the geometry of which reproduces substantially the geometry of the surface of the element 20 to which it is applied. The sole difference is due to the fact that the holes provided in the gasket 38 have a diameter of about 0.5 mm, that is, a diameter slightly less than the diameter of the holes of the frontal member 20.

The close adhesion of the gasket 38 to the frontal member 20 is ensured by the pressure exerted on the gasket itself by the positioning tool 35 once it is engaged on the pins 19.

Figure 15:
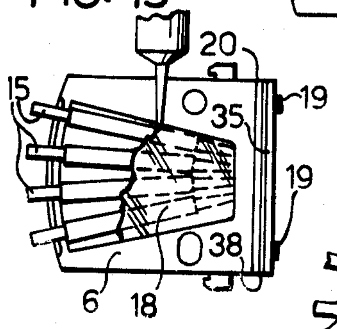

At this point, the flexible resin mass 18 intended to act as an insulator against vibrations between the tubes 15 and the frontal plate member 20 (FIG. 5) is poured into the body 6 (FIG. 15). After pouring, the resin mass is subjected to a treatment to cause its low-temperature polymerization.

After polymerization of the resin 18 cast in the body 6, the positioning tool 35 and the gasket 38 are finally removed from the body 6. The frontal surface of the head 1 defined by the surface of the element 20 opposite the body 6 is then subjected to lapping to eliminate any projections from the ends 16 of the tubes 15 and any rough edges of resin 18 projecting outwardly of the element 20 through the annular spaces between the outer surfaces of the ends 16 and the inner walls of the holes 22.

Figure 16:
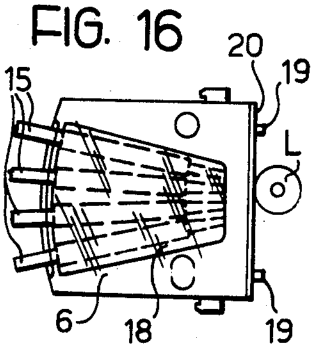

At the end of the lapping operation, carried out by a tool schematically indicated L in FIG. 16, the second frontal element 23 carrying the nozzles 5 is finally applied to the outer surface of the frontal member 20.

Again in this case, the presence of the apertures 24, which are slidingly engaged by the pins 19, allows precise positioning of the element 23 relative to the member 20 to be achieved. It is thus ensured that each of the nozzles 5 is perfectly aligned with the corresponding aperture 22 and consequently with the end 16 of the corresponding ink supply tube 15.

The second element 23 is then clamped to the front wall of the body 6 by the snap-engagement of the spring 26 (FIG. 17).

Immediately before or after the assembly of the second frontal member 23, the ink supply tubes 4 are connected to the rear ends of the tubes 15.

In order to facilitate this connection, the end of each tube 4 in initially widened by the insertion (as shown schematically in FIG. 18) of a sleeve 40, for example of nickel, having an internal diameter equal to the outer diameter of the tubes 15*a* and a thickness of 20–50 μm. The edge of the tube 15*a*, however, has a flare 41. The tube 15*a* is then inserted in the sleeve 40 and a ring of glue 42 is deposited in the junction zone. The glue penetrates between the sleeve 40 and the tube 15*a* and thus forms another ring in correspondence with the flare 41. Finally, the junction of the tube 4 and the tube 15*a* may be covered by a tube 44 of thermo-shrinking material which, after being heated, draws itself out so as to mechanically lock and hydraulically seal the two tubes.

Naturally, the principle of the invention remaining the same, the constructional details and forms of embodiment may be varied widely with respect to that described and illustrated, without thereby departing from the scope of the present invention.

We claim:

1. An ink-jet printing head comprising an ink reservoir, a plurality of tubes each having one end communicating with the ink reservoir, a respective electrical signal transducer associated with each tube to generate an instantaneous variation in the volume of the tube so as to cause the discharge of the ink through the other end of the tube towards a printing surface, and a common support for the tubes having a plate member provided with a series of nozzles aligned with the other ends of the tubes, wherein the plate member is mounted on the support so as not to touch the other ends of the tubes, whereby the tubes are free to follow the volume variations caused by the corresponding transducers.

2. A head according to claim 1, wherein the plate member is retained on the support by pressure means and is spaced from the other ends of the tubes by a plurality of annular sealing members of yielding material.

3. A head according to claim 2, wherein the support is constituted by a housing in which the tubes and the transducers are embedded in a retaining mass of resilient resin.

4. A head according to claim 3, wherein the housing is closed by a further plate member having apertures forming seats in which the other ends of the tubes are encased by the resin, and the sealing members are disposed between the plate member and the further plate member.

5. A head according to claim 1, wherein each nozzle is constituted by an aperture of substantially cylindrical profile in the plate member, the axes of the apertures being parallel to each other.

6. A head according to claim 5, wherein the plate member has tubular drop-breaking appendages on its surface facing the printing surface and surrounding the nozzles, the inner surfaces of the appendages forming at least part of the substantially cylindrical profiles.

7. A head according to claim 6, wherein each of the nozzles with its respective tubular appendage is formed by a tubular insert in the plate member.

8. A head according to claim 6, wherein each of the nozzles has a variable profile including a cylindrical portion facing the printing surface and a conical portion diverging from the cylindrical portion towards the other ends of the tubes.

9. A head according to claim 1, wherein the support and the plate member have complementary engagement formations for facilitating the correct positioning of the plate member relative to the support.

10. A head according to claim 1, wherein the support has associated spring members for attaching the plate member to the support.

11. A head according to claim 10, wherein the support has profiled parts constituting engagement formations for the spring members.

12. A head according to claim 10, wherein the spring member is generally C-shaped with a central part and lateral arms for connection to the support, the central part being generally arcuate in its rest condition so that, when the spring member is mounted on the support, the central part exerts a resilient pressure on the plate member.

13. A head according to claim 1, wherein the tubes are arranged in flat arrays each of which comprises substantially straight tubes whose main axes converge towards the portion of the support in which the plate member is located, and the arrays of tubes lie in planes which converge on each other towards the portion of the support in which the plate member is located.

14. A head according to claim 13, wherein the support comprises a substantially U-shaped structure and the arrays of tubes are separated by partitions integral with the structure.

15. A head according to claim 14, wherein it includes two arrays of tubes, and wherein the U-shaped structure has two arrays of notches associated with the tubes and opening in opposite directions relative to the partition separating the arrays.

16. A method for the manufacture of an ink-jet printing head comprising an ink reservoir, a plurality of tubes each having one end communicating with the ink reservoir, a respective electrical signal transducer associated with each tube to generate an instantaneous variation in the volume of the tube so as to cause the discharge of the ink through the other end of the tube towards a printing surface, and a common support for the tubes having a plate member provided with a series of nozzles aligned with the other ends of the tubes and mounted on the support so as not to touch the other ends of the tubes, whereby the tubes are free to follow the volume variations caused by the corresponding transducers, wherein the method comprises, in sequence, the steps of:

providing a tool for positioning the tubes, which is plate-shaped and is provided with apertures for receiving and guiding the said other ends of the tubes located in positions corresponding to the positions of the nozzles of the plate member;

applying the positioning tool to the support;

mounting the tubes on the support, the other end of each tube being introduced into a respective receiving and guide aperture of the positioning tool;

fixing the tubes to the support;

removing the positioning tool from the support, and applying the plate member to the support.

17. A method according to claim 16, wherein it includes the steps of:

preliminary fixing the tubes to the support by gluing, the other ends of the tubes being introduced into the receiving and guiding apertures of the positioning tool;

removing the positioning tool from the housing, and finally fixing the tubes to the support by the application of a resin mass to the support and the subsequent hardening of the resin.

18. A method according to claim 17, for the manufacture of a head in which the support is constituted by a housing closed by a further plate member having apertures forming seats in which the other ends of the tubes are encased by the resin, wherein the further plate member is applied to the housing before the application of the resin mass to the latter.

19. A method according to claim 18, wherein the surface of the further plate member opposite the housing is subjected to lapping.

20. A method according to claim 19, wherein the lapping is carried out after the resin mass has been applied to the housing.

21. A method for the manufacture of an ink-jet printing head comprising an ink reservoir, a plurality of tubes each having one end communicating with the ink reservoir, a respective electrical signal transducer associated with each tube to generate an instantaneous variation in the volume of the tube so as to cause the discharge of the ink through the other end of the tube towards a printing surface, and a common support for the tubes having a plate member provided with a series of nozzles aligned with the other ends of the tubes and mounted on the support so as not to touch the other ends of the tubes, whereby the tubes are free to follow the volume variations caused by the corresponding transducer, in which the support is constituted by a housing closed by a further plate member having apertures forming seats in which the other ends of the tubes are encased by the resin, wherein the method includes the steps of:

providing a tool for the positioning of the tubes, which is plate-shaped and is provided with apertures for receiving and guiding the other ends of the tubes located in positions corresponding to the positions of the nozzles of the plate member;

applying the positioning tool to the housing constituting the support;

mounting the tubes in the housing with the introduction of the other end of each tube into a respective receiving and guide aperture in the positioning tool;

the preliminary fixing of the tubes to the housing by glue;

removing the positioning tool from the housing;

applying the further plate member to the housing;

applying to the surface of the further plate member opposite the housing a sealing gasket whose shape essentially reproduces the shape of the further plate member;

reapplying the positioning tool to the housing, the positioning tool being pressed against the sealing gasket;

finally fixing the tubes to the housing by the application of a resin mass to the housing and the subsequent hardening of this resin mass;

removing the positioning tool and the sealing gasket from the housing;

lapping the surface of the further plate member opposite the housing, and applying the plate member to the housing.

22. A method for the manufacture of an ink-jet printing head comprising an ink reservoir, a plurality of tubes each having one end communicating with the ink reservoir, a respective electrical signal transducer associated with each tube to generate an instantaneous variation in the volume of the tube so as to cause the discharge of the ink through the other end of the tube towards a printing surface, and a common support for the tubes having a plate member provided with a series of nozzles aligned with the other ends of the tubes and mounted on the support so as not to touch the other ends of the tubes, whereby the tubes are free to follow the volume variations caused by the corresponding transducer, wherein the method includes the steps of:

providing a plate-shaped body for defining the plate member provided with the nozzles;

applying a layer of material resistant to photo-engraving to circular annular zones surrounding the nozzles on at least the face of the plate body intended to define the surface of the plate member which is opposite the support in use, and subjecting said at least one face of the plate body to photo-engraving.

23. A method for the manufacture of an ink-jet printing head comprising an ink reservoir, a plurality of tubes each having one end communicating with the ink reservoir, a respective electrical signal transducer associated with each tube to generate an instantaneous variation in the volume of the tube so as to cause the discharge of the ink through the other end of the tube towards a printing surface, and a common support for the tubes having a plate member provided with a series of nozzles aligned with the other ends of the tubes and mounted on the support so as not to touch the other ends of the tubes, whereby the tubes are free to follow the volume variations caused by the corresponding transducer, wherein the method includes the steps of:

providing a plate-shaped body of a predetermined thickness for defining the plate member and having apertures located at the sites of the nozzles;

providing tubular capillary elements which can be introduced into these apertures and have axial dimensions greater than the thickness of the plate body, and mounting the tubular capillary elements in the apertures of the plate body in an arrangement such that one of the end faces of each tubular capillary element is substantially aligned with one of the faces of the plate body, while the opposite end of each tubular capillary element projects from the other face of the plate body.

24. A method according to claim 23, wherein the opposite end of each tubular capillary element is subjected in sequence to lapping and chromium plating.

25. A method according to claim 22 for the manufacture of a head in which the support is constituted by a housing closed by a further plate member having apertures forming seats in which the other ends of the tubes are encased by the resin, wherein it includes the steps of applying annular gaskets of ductile material to the face of the plate body intended to define the face of the plate member facing the support, each gasket sealingly connecting the facing edges of the aligned apertures of the plate member and the further plate member in use, effectively preventing the transmission of mechanical vibrational forces between the plate members.

26. Method for the manufacture of an ink-jet printing head comprising an ink reservoir, a plurality of tubes each having one end communicating with the ink reservoir, a respective electrical signal transducer associated with each tube to generate an instantaneous variation in the volume of the tube so as to cause the discharge of the ink through the other end of the tube towards a printing surface, and a common support for the tubes having a plate member provided with a series of nozzles aligned with the other ends of the tubes and mounted on the support so as not to touch the other ends of the tubes, whereby the tubes are free to follow the volume variations caused by the corresponding transducer, in which it further includes flexible tubes each of which puts the ink reservoir into communication with the said one end of a respective tube, wherein the method includes the steps of:

providing tubular sleeves which can be fitted onto the said one ends of the tubes;

working the said one end of each tube so as to give it a generally conical (flared) profile which converges outwardly of the tube;

expanding the end of each flexible tube intended to be coupled to a tube by the introduction of one of the tubular sleeves into the end to be expanded;

coupling each flexible tube to the respective tube by fitting the tubular sleeve mounted in the expanded end onto the conically profiled end of the tube, and firmly connecting the flexible tube and the respective tube so coupled by the introduction of a mass of glue between the tubular sleeve and the conically profiled end of the tube.

27. Method according to claim 26, wherein it further includes the steps of:

fitting a further tubular element of thermo-shrinking material onto the expanded end of each flexible tube firmly connected to the respective tube, and heating the further tubular member to cause the shrinking.

28. A tool useable for the manufacture of a ink-jet printing head comprising an ink reservoir, a plurality of tubes each having one end communicating with the ink reservoir, a respective electrical signal transducer associated with each tube to generate an instantaneous variation in the volume of the tube so as to cause the discharge of the ink through the other end of the tube towards a printing surface, and a common support for the tubes having a plate member provided with a series of nozzles aligned with the other ends of the tubes and mounted on the support so as not to touch the other ends of the tubes, whereby the tubes are free to follow the volume variations caused by the corresponding transducer, wherein the tool comprises a flat body the shape of which reproduces essentially the shape of the plate member, the body being provided with apertures for receiving and guiding the said other ends of the tubes located in positions corresponding to the positions of the nozzles in the plate member.

29. A tool according to claim 28, wherein the receiving and guiding apertures are constituted by holes having enlarged mouths for the introduction of the said other ends of the tubes.

30. A tool according to claim 28, for the manufacture of a printing head in which the tubes are arranged in flat arrays each of which comprises substantially straight tubes whose main axes converge towards the portion of the support in which the plate member is located, and the arrays of tubes lie in planes which converge on each other towards the portion of the support in which the plate member is located, wherein the receiving and guiding apertures have respective main axes which are angled to the opposite faces of the flat body in correspondence with the angles formed in the assembled head between the main axes of the respective tubes and the opposite faces of the plate member.

* * * * *